(12) United States Patent
Lei et al.

(10) Patent No.: US 12,495,445 B2
(45) Date of Patent: Dec. 9, 2025

(54) METHODS AND APPARATUS FOR DETECTING SIDELINK TRANSMISSION BURST OVER UNLICENSED SPECTRUM

(71) Applicant: Lenovo (Beijing) Ltd., Beijing (CN)

(72) Inventors: Haipeng Lei, Beijing (CN); Xiaodong Yu, Beijing (CN); Zhennian Sun, Beijing (CN)

(73) Assignee: Lenovo (Beijing) Ltd., Beijing (CN)

( * ) Notice: Subject to any disclaimer, the term of this patent is extended or adjusted under 35 U.S.C. 154(b) by 428 days.

(21) Appl. No.: 18/013,460

(22) PCT Filed: Jul. 10, 2020

(86) PCT No.: PCT/CN2020/101303
§ 371 (c)(1),
(2) Date: Dec. 28, 2022

(87) PCT Pub. No.: WO2022/006842
PCT Pub. Date: Jan. 13, 2022

(65) Prior Publication Data
US 2023/0276492 A1 Aug. 31, 2023

(51) Int. Cl.
*H04W 74/0808* (2024.01)
*H04L 5/00* (2006.01)
(Continued)

(52) U.S. Cl.
CPC ......... *H04W 74/0808* (2013.01); *H04L 5/001* (2013.01); *H04L 5/0078* (2013.01); *H04W 16/14* (2013.01); *H04W 72/0457* (2023.01)

(58) Field of Classification Search
CPC ............. H04W 74/0808; H04W 16/14; H04W 72/0457; H04W 72/0446; H04W 72/40;
(Continued)

(56) References Cited

U.S. PATENT DOCUMENTS

2015/0146647 A1  5/2015  Chatterjee et al.
2018/0054741 A1* 2/2018  Fröberg Olsson ........... H04W 74/0808
(Continued)

FOREIGN PATENT DOCUMENTS

CN  103155634 A  6/2013
CN  107926049 A  4/2018
(Continued)

OTHER PUBLICATIONS 20944647.5, "Extended European Search Report", EP Application No. 20944647.5, Mar. 28, 2024, 10 pages.
(Continued)

*Primary Examiner* — Chae S Lee
(74) *Attorney, Agent, or Firm* — FIG. 1 Patents

(57) ABSTRACT

Embodiments of the present disclosure relate to methods and apparatuses for detecting a sidelink transmission burst over an unlicensed spectrum. According to an embodiment of the present disclosure, a method performed by a user equipment (UE) for wireless communication includes: generating a sequence; and transmitting the sequence at a beginning of a sidelink burst on a carrier, starting from a first candidate position of a set of candidate positions in a first slot, wherein the sequence spans a predetermined number of consecutive symbols in time domain and the sidelink burst is contiguously transmitted in time domain without any gap.

20 Claims, 6 Drawing Sheets

(51) Int. Cl.
*H04W 16/14* (2009.01)
*H04W 72/0457* (2023.01)

(58) Field of Classification Search
CPC ......... H04W 52/0216; H04W 52/0248; H04W 92/18; H04L 5/001; H04L 5/0078; H04L 27/26134; H04L 1/08; H04L 27/26025; H04L 5/0094; H04L 5/0007; H04L 27/2613; H04L 5/0044; H04L 5/0053
See application file for complete search history.

(56) References Cited

U.S. PATENT DOCUMENTS

| | | | |
|---|---|---|---|
| 2018/0234965 A1 | 8/2018 | Ahn et al. | |
| 2019/0378543 A1 | 12/2019 | Maeto et al. | |
| 2020/0015214 A1* | 1/2020 | Si | H04W 72/20 |
| 2020/0015230 A1 | 1/2020 | Chae et al. | |
| 2020/0084812 A1 | 3/2020 | Salem et al. | |
| 2020/0344722 A1* | 10/2020 | He | H04W 72/02 |
| 2021/0136800 A1* | 5/2021 | Li | H04W 72/044 |
| 2021/0400725 A1* | 12/2021 | Harada | H04L 5/0005 |
| 2023/0029702 A1* | 2/2023 | Harada | H04L 5/0051 |
| 2023/0247528 A1* | 8/2023 | Liu | H04W 74/0808 370/329 |

FOREIGN PATENT DOCUMENTS

| | | |
|---|---|---|
| CN | 110100462 A | 8/2019 |
| CN | 110431902 A | 11/2019 |
| CN | 111148229 A | 5/2020 |
| CN | 111345100 A | 6/2020 |
| CN | 111385765 A | 7/2020 |
| WO | 2018201819 A1 | 11/2018 |

OTHER PUBLICATIONS

Intel Corporation, "Synchronization Design for NR V2X Sidelink Communication", 3GPP Draft; R1-1906797 Intel—EV2X SL Sync, 3rd Generation Partnership Project (3GPP), vol. RAN WG1, No. Reno, USA, May 13, 2019, Retrieved from the Internet: <URL:http://www.3gpp.org/ftp/Meetings%5F3G PP%5FSYNC/RAN 1 /Docs/R1%2D1906797%2Ezip>, May 13, 2019.
PCT/CN2020/101303, "International Preliminary Report on Patentability", PCT Application No. PCT/CN2020/101303, Jan. 19, 2023, 5 pages.
PCT/CN2020/101303, "International Search Report and Written Opinion", PCT Application No. PCT/CN2020/101303, Jan. 27, 2021, 6 pages.
"Foreign Office Action", CN Application No. 202080102785.7, Jan. 22, 2025, 18 pages.

* cited by examiner

METHODS AND APPARATUS FOR DETECTING SIDELINK TRANSMISSION BURST OVER UNLICENSED SPECTRUM

TECHNICAL FIELD

Embodiments of the present disclosure are related to wireless communication technologies, and more particularly, related to methods and apparatuses for detecting a sidelink transmission burst over an unlicensed spectrum.

BACKGROUND

In a new radio (NR) communication system, a transmitting user equipment (UE), hereinafter referred to as a "Tx UE," may send a sidelink transmission to a specific receiving UE (hereinafter referred to as an "Rx UE") in a unicast mode, to a group of Rx UEs in a groupcast mode, or to Rx UEs within a range in a broadcast mode. When an unlicensed spectrum is used for sidelink transmissions, in order to achieve fair coexistence with other wireless systems, a channel access procedure, also named "listen before talk" (LBT) procedure, is required before any sidelink transmission. In the LBT procedure, a UE performs energy detection on a channel. If the detected energy is lower than a predefined threshold, the channel is deemed as empty and available for transmission, and then the LBT procedure is successful. Only when the LBT procedure is successful, the UE can start the transmission on the channel and occupy the channel up to a maximum channel occupancy time (MCOT); otherwise, the UE cannot start the transmission and need continue to perform another LBT procedure until a successful LBT procedure.

On the other hand, a sidelink UE may monitor a physical sidelink control channel (PSCCH), which may carry sidelink control information (SCI) including time-frequency resource information for associated physical sidelink shared channel (PSSCH) scheduling. When an unlicensed spectrum is used for sidelink transmissions, it is unnecessary for the sidelink UE to blind detect SCI in each slot if the channel is occupied by other wireless access technologies, e.g., WiFi, or other operators nearby, or if the channel is occupied by other UEs and the transmissions are not of interest to the sidelink UE. Thus, it is needed to develop a method to enable the sidelink UE to know who is occupying the channel and whether the ongoing transmission is of interest to it without detecting or decoding SCI so as to save power consumption.

SUMMARY OF THE DISCLOSURE

According to an embodiment of the present disclosure, a method performed by a user equipment (UE) for wireless communication may include: generating a sequence; and transmitting the sequence at a beginning of a sidelink burst on a carrier, starting from a first candidate position of a set of candidate positions in a first slot, wherein the sequence spans a predetermined number of consecutive symbols in time domain and the sidelink burst is contiguously transmitted in time domain without any gap.

According to another embodiment of the present disclosure, a method performed by a UE for wireless communication may include: detecting, on a carrier, a sequence at a first candidate position of a set of candidate positions in a slot, wherein the sequence spans a predetermined number of consecutive symbols in time domain; and receiving a sidelink transmission from the first candidate position in the slot in response to the sequence being detected at the first candidate position.

According to yet another embodiment of the present disclosure, an apparatus may include: at least one non-transitory computer-readable medium having stored thereon computer executable instructions; at least one receiving circuitry; at least one transmitting circuitry; and at least one processor coupled to the at least one non-transitory computer-readable medium, the at least one receiving circuitry and the at least one transmitting circuitry. The computer executable instructions may cause the at least processor to implement a method according to any embodiment of the present disclosure.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the present disclosure can be obtained, a description of the present disclosure is rendered by reference to specific embodiments thereof which are illustrated in the appended drawings. These drawings depict only exemplary embodiments of the present disclosure and are not therefore intended to limit the scope of the present disclosure.

DETAILED DESCRIPTION

The detailed description of the appended drawings is intended as a description of the currently preferred embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

In the following description, numerous specific details are provided, such as examples of programming, software modules, network transactions, database structures, hardware modules, hardware circuits, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference will now be made in detail to some embodiments of the present disclosure, examples of which are illustrated in the accompanying drawings. To facilitate understanding, embodiments are provided under specific network architecture and new service scenarios, such as 3rd Generation Partnership Project (3GPP) 5G, 3GPP Long Term Evolution (LTE) and so on. Persons skilled in the art know very well that, with the development of network architecture and new service scenarios, the embodiments in the present disclosure are also applicable to similar technical problems; and moreover, the terminologies recited in the present disclosure may change, which should not affect the principle of the present disclosure.

Figure 1:
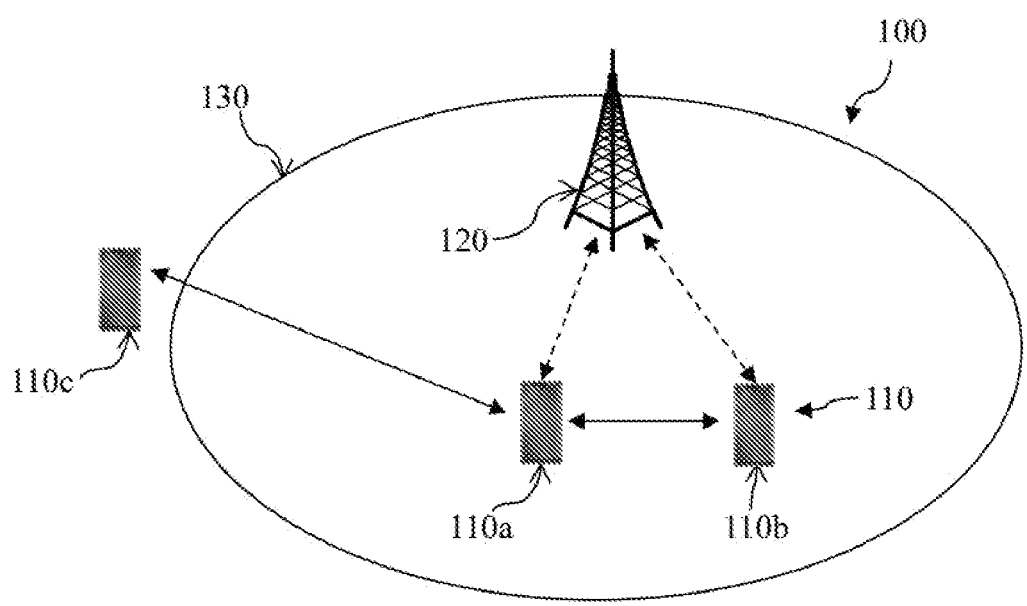
FIG. 1 illustrates a schematic diagram of a wireless communication system according to some embodiments of the present disclosure.

FIG. 1 illustrates a schematic diagram of a wireless communication system 100 according to some embodiments of the present application.

As shown in FIG. 1, a wireless communication system 100 may include a base station (e.g., BS 120) and some UEs 110 (e.g., UE 110a, UE 110b, and UE 110c). Although a specific number of UEs 110 and one BS 120 are depicted in FIG. 1, it is contemplated that wireless communication system 100 may also include more BSs and more or fewer UEs in and outside of the coverage of the BSs.

The UEs and the BS may support communications based on, for example, 3G, LTE, LTE-advanced (LTE-A), NR, or other suitable protocol(s). For example, the BS 120 may include an eNB or a gNB. The UE 110a, UE 110b, or UE 110c may include, for example, but is not limited to, a computing device, a wearable device, a mobile device, an IoT (Internet of Things) device, a vehicle, etc. Persons skilled in the art should understand that as technology develops and advances, the terminologies described in the present disclosure may change, but should not affect or limit the principles and spirit of the present disclosure.

The BS 120 may define one or more cells, and each cell may have a coverage area 130. In the exemplary wireless communication system 100, some UEs (e.g., UE 110a and UE 110b) are within the coverage of the BS 120, which may not be a specific base station 120 shown in FIG. 1 and can be any one of the base stations 120 in a wireless communication system, and some UEs (e.g., UE 110c) are outside of the coverage of the BS 120. For example, in the case that the wireless communication system includes two BSs 120, UE 110a being within the coverage of any one of the two BSs 120 means that UE 110a is within the coverage of a BS 120 (i.e., in-coverage) in the wireless communication system; and UE 110a being outside of the coverage of both BSs 120 means that UE 110a is outside of the coverage of a BS 120 (i.e., out-of-coverage) in the wireless communication system.

Still referring to FIG. 1, the UE 110a and UE 110b may communicate with the BS 120 via, for example, a Uu link (denoted by dotted arrow in FIG. 1). The UE 110a, UE 110b, and UE 110c may communicate with each other via a sidelink (denoted by solid arrow in FIG. 1), and may form a UE group. During a sidelink communication, a Tx UE may transmit signaling, data, or both to an Rx UE. For example, referring to FIG. 1, a Tx UE (e.g., UE 110a) may transmit data to an Rx UE (e.g., UE 110b or UE 110c).

BSs (e.g., BS 120 in FIG. 1) and UEs (e.g., UE 110a, UE 110b, and UE 110c in FIG. 1) may operate in both a licensed spectrum and an unlicensed spectrum. For example, the unlicensed spectrum may be at around 6 GHz or 60 GHz of carrier frequency. NR-U (NR system access on unlicensed spectrum) operating bandwidth may be an integer multiple of 20 MHz. For a bandwidth larger than 20 MHz, e.g., 40 MHz, 60 MHz, 80 MHz, or 100 MHz, the carrier bandwidth may be partitioned into subbands, each of which has a bandwidth of 20 MHz and may be indexed.

When an unlicensed spectrum is used for sidelink transmissions between UEs (e.g., between a Tx UE and an Rx UE), a Tx UE is required to perform an LBT procedure before performing any sidelink transmission. The LBT procedure is performed based on energy detection in each sensing slot. In detail, if the detected energy on one channel in one sensing slot is lower than an energy detection threshold, then the channel is deemed as empty or clear or available in that sensing slot; otherwise, the channel is deemed as occupied or non-available in that sensing slot. For a Type-1 channel access procedure, also named "LBT Category 4 or LBT Cat.4 procedure," usually, the energy detection needs to be performed in a range from several sensing slots to hundreds of sensing slots. A random backoff counter is selected from a contention window at the beginning of the LBT Cat.4 procedure. The random backoff counter will be decremented by 1 each time when the Tx UE detects that the channel is empty in one sensing slot. When the random backoff counter counts down to zero, the channel can be regarded as available and the LBT Cat.4 procedure is successful. Then, the Tx UE can determine a channel occupancy time (COT) not larger than an MCOT and start the sidelink transmission on the channel within the COT. In the LBT Cat.4 procedure, the contention window is continuously updated based on the hybrid automatic repeat request (HARQ)-acknowledgement (ACK) feedback from an Rx UE. The more detailed Type-1 channel access procedure is specified in 3GPP standard document TS37.213.

Wireless transmissions on an unlicensed spectrum should meet the requirements of the regulations subject to the management of the country or region where a wireless communication device (e.g., a UE) is located. The design of an uplink waveform for NR-U physical uplink shared channel (PUSCH) and physical uplink control channel (PUCCH) should meet these regulation requirements on an unlicensed spectrum. The requirements mainly include two aspects:

(1) Occupied channel bandwidth (OCB): the bandwidth containing 99% of the power of the signal, shall be between 80% and 100% of the declared Nominal Channel Bandwidth; and (2) Maximum power spectrum density (PSD) with a resolution bandwidth of 1 MHz (e.g., 10 dBm/MHz).

The above two requirements dictate that a signal which occupies a small portion of the channel bandwidth cannot be transmitted at the maximum available power at the UE due to the PSD and OCB constraints.

To meet the regulation requirements, an interlace-based waveform is employed as an uplink waveform for an unlicensed spectrum. For NR-U, an interlace-based waveform can be used to achieve power boosting under PSD limit and meet the regulation requirements defined for OCB. So interlace-based transmission is also adopted for NR UL transmission.

In NR systems, multiple interlaces of resource blocks (RBs) are defined in common resource blocks (CRBs) based on the subcarrier spacing. The total number of interlaces distributed within the bandwidth of a carrier may be based on only the subcarrier spacing regardless of the bandwidth of the carrier. The subcarrier spacing of NR systems may be 15×2ⁿ kHz, where n is an integer. The subcarrier spacing may be 15 kHz, 30 kHz, or 60 kHz for frequency range 1 (FR1), and different subcarrier spacing values can support different maximum bandwidths. In some examples, for a carrier with 15 kHz subcarrier spacing, there may be 10 interlaces on the carrier. In some examples, for a carrier with 30 kHz subcarrier spacing, there may be 5 interlaces on the carrier. In some examples, for a carrier with 60 kHz subcarrier spacing, there may be 2 or 3 interlaces on the carrier. It should be understood that the number of interlaces (e.g., 10 interlaces for a carrier with 15 kHz subcarrier spacing, or 5 interlaces for a carrier with 30 kHz subcarrier spacing) is only for illustrative purposes, and should not be construed as limits to the embodiments of the present disclosure.

The number of RBs of each interlace on a carrier may be dependent on the bandwidth of the carrier. For example, when the carrier bandwidth is 20 MHz and the subcarrier spacing is 15 kHz, each of the 10 interlaces may include 10 or 11 RBs. When the carrier bandwidth is 20 MHz and the subcarrier spacing is 30 kHz, each of the 5 interlaces may include 10 or 11 RBs. It should be understood that the number of RBs is only for illustrative purposes, and should not be construed as limits to the embodiments of the present disclosure. For a carrier bandwidth larger than 20 MHz, the same spacing between consecutive RBs in an interlace is maintained for all interlaces regardless of the carrier bandwidth. In other words, the number of RBs per interlace may be dependent on the carrier bandwidth. Keeping the same interlace spacing with an increasing bandwidth is a straightforward and simple way to scale the interlace design from 20 MHz to a wider bandwidth.

Figure 2:
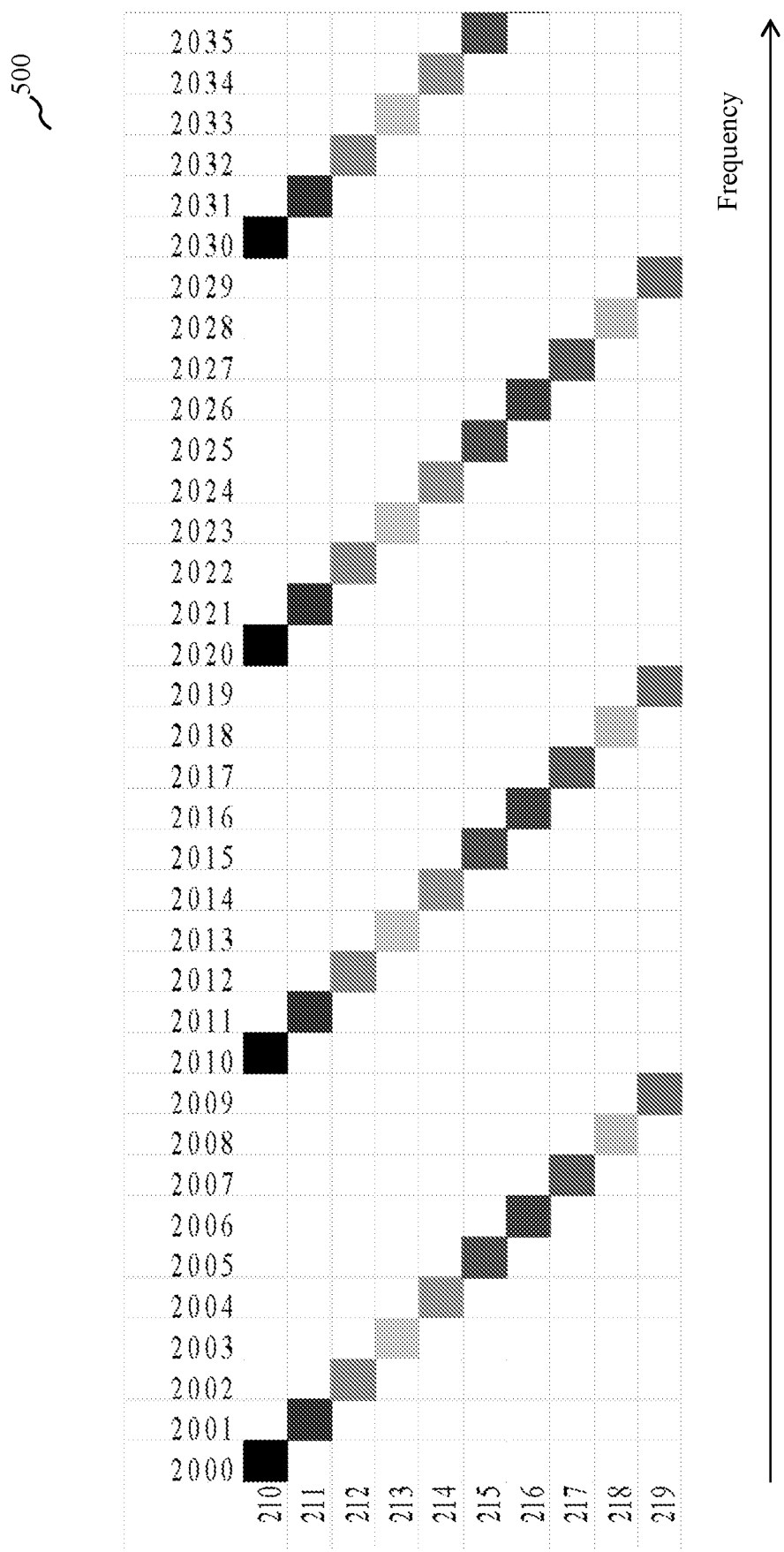
FIG. 2 illustrates an example of an interlace-based resource block configuration according to some embodiments of the present disclosure.

FIG. 2 illustrates an example of an interlace-based resource block configuration 200 for 15 kHz subcarrier spacing according to some embodiments of the present disclosure. It should be understood that configuration 200 is only for illustrative purposes, and should not be construed as limits to the embodiments of the present disclosure.

As shown in FIG. 2, a carrier bandwidth may be partitioned into RBs. As an illustrative purpose, FIG. 2 only shows a part of the RBs (e.g., RBs that are represented with reference numerals 2000 to 2035 in FIG. 2) included in the carrier bandwidth. Persons skilled in the art can readily know the number of RBs included in a certain carrier bandwidth.

As mentioned above, the number of interlaces distributed within the bandwidth of a carrier may be based on only the subcarrier spacing regardless of the bandwidth of the carrier. In the example of FIG. 2, the RBs of the carrier bandwidth are partitioned into 10 interlaces (corresponding to the 15 kHz subcarrier spacing), which are respectively represented with reference numerals 210, 211, 212, 213, 214, 215, 216, 217, 218, and 219 in FIG. 2.

Each interlace of the 10 interlaces may include evenly-spaced RBs in frequency domain. The number of RBs included in each of the 10 interlaces may depend on the carrier bandwidth. As shown in FIG. 2, the interlace represented with reference numeral 210 may include RB 2000, RB 2010, RB 2020, RB 2030, and so on; the interlace represented with reference numeral 211 may include RB 2001, RB 2011, RB 2021, RB 2031, and so on; and the interlace represented with reference numeral 219 may include RB 2009, RB 2019, RB 2029, and so on. RB 2000 to RB 2035 may be indexed from "0" to "35" along the frequency axis, and interlaces 210 to 219 may be indexed from "0" to "9."

Similarly, interlace-based transmission can also be adopted for sidelink transmission. For example, one or more of interlaces 210 to 219 may be assigned for a sidelink transmission over an unlicensed spectrum.

For sidelink transmissions, there are two resource allocation modes specified since LTE Rel-12 Device-to-Device (D2D) communication and further extended to LTE/NR Vehicle-to-everything (V2X) communication. Resource allocation based on a base station's (e.g., gNB's or eNB's) scheduling is termed as Mode 1, and resource allocation based on UE's autonomous selection is termed as Mode 2.

Either for Mode 1 or for Mode 2, the SCI is transmitted on a PSCCH which includes time-frequency resource information for associated PSSCH scheduling. The SCI and associated PSSCH are transmitted from a Tx UE to a specific Rx UE in a unicast manner, to a group of Rx UEs in a groupcast manner, or to any other UEs within a range in a broadcast manner.

In Mode 1, exact resources for a sidelink transmission are assigned by a base station via dynamic scheduling or configured grant. In Mode 2, a UE needs to perform resource sensing via decoding all SCI transmitted in the SCI resource pool so as to get full knowledge of resource reservation information. After sensing, the UE may identify the available resources and then randomly select the required resources from the available resources.

When an unlicensed spectrum is used for sidelink transmissions, from the perspective of a UE, if a channel is occupied by other wireless access technologies, e.g., WiFi, or other operators nearby, or if the channel is occupied by other UEs and the transmissions are not of interest to the UE, it is unnecessary for the UE to blind detect the SCI on the channel in each slot, which would consume the UE's battery power. The embodiments of the present disclosure as described below provide exemplary solutions for detecting a sidelink transmission burst on an unlicensed spectrum so that a sidelink UE can avoid unnecessary channel access procedures or blind detecting ongoing transmissions which are not of interest to the sidelink UE, thereby saving power of the sidelink UE.

Figure 3:
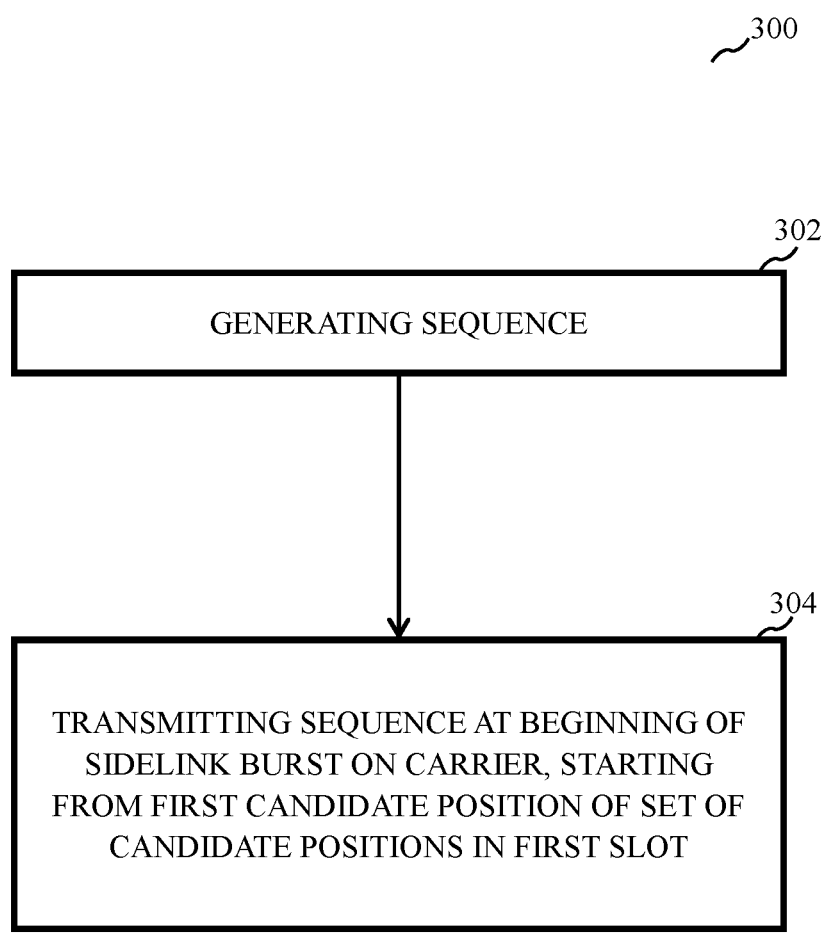
FIG. 3 illustrates an exemplary flow chart of a method for detecting a sidelink transmission burst over an unlicensed spectrum according to some embodiments of the present disclosure.

FIG. 3 illustrates an exemplary flow chart of a method 300 for detecting a sidelink transmission burst over an unlicensed spectrum according to some embodiments of the present disclosure. The method 300 may be performed by a Tx UE or other devices having similar functionality.

As shown in FIG. 3, the Tx UE may generate a sequence in step 302. The sequence is to be transmitted at a beginning of a sidelink transmission (also, a sidelink burst) on a carrier, and is predefined for other UEs (e.g., an Rx UE) to determine whether the sidelink transmission is an NR sidelink transmission or a transmission using other wireless access technologies (e.g., WiFi), or whether the sidelink transmission is a sidelink unicast, groupcast, or broadcast communication of interest or not.

In order to keep orthogonality in the whole frequency domain, the sequence is generated relative to subcarrier 0 of CRB 0 (e.g., RB 2000 in FIG. 2) of the carrier, and may occupy all the subcarriers on the carrier. In time domain, the sequence may occupy a predetermined number of consecutive symbols.

In some embodiments of the present disclosure, the predetermined number is based on a subcarrier spacing (SCS) value and an automatic gain control (AGC) retuning time. For example, the first symbol of a sidelink transmission is normally used for an AGC purpose and does not carry valid user data. When the AGC retuning time is in a range of 20~30 us, it does not take a whole symbol duration for AGC retuning in the case of 15 or 30 kHz SCS. In such a case, the sequence may occupy only the first symbol of the sidelink transmission. That is, the predetermined number is one. However, in the case of 60 or 120 kHz or even higher SCS, the AGC retuning may not be completed within the duration of the first symbol. For reliability purpose, the sequence should occupy more than one symbol of the sidelink transmission such that it can be correctly detected by other UEs (e.g., an Rx UE). That is, the predetermined number is more than one. The predetermined number may be configured via radio resource control (RRC) signaling or predefined in standards based on the SCS value of the carrier and the AGC retuning time.

As a result, the length of the sequence is equal to a total number of subcarriers of the carrier multiplied by the predetermined number. In some embodiments of the present disclosure, the sequence is cyclically mapped on each of the predetermined number of consecutive symbols in a frequency-first manner from the lowest subcarrier to the highest subcarrier of the carrier. Assuming there are a total of N subcarriers on the carrier and the predetermined number is M, then the sequence length is equal to N*M. The sequence may be denoted as {a0, a1, a2, a3, a4, a5, a6, a7, a8, . . . , $a_{N-1}$, $a_N$, $a_{N+1}$, . . . , $a_{N*M-1}$}. The sequence is cyclically mapped on each of the predetermined number of consecutive symbols in a frequency-first manner, which means mapping a0 on subcarrier 0 of the first symbol, a1 on subcarrier 1 of the first symbol, a2 on subcarrier 2 of the first symbol, a3 on subcarrier 3 of the first symbol, a4 on subcarrier 4 of the first symbol, and so on, till all the subcarriers of the first symbol have been mapped on, and then starting to map $a_N$ on subcarrier 0 of the second symbol, $a_{N+1}$ on subcarrier 1 of the second symbol, $a_{N+2}$ on subcarrier 2 of the second symbol, and so on, till all the subcarriers of the second symbol have been mapped on, and then repeating such mapping on the remaining symbol(s), till all the subcarriers of all the M symbols have been mapped on. It should be understood that the length of the sequence in this example is only for illustrative purpose, and should not be construed as limits to the embodiments of the present disclosure.

In some embodiments of the present disclosure, the length of the sequence is equal to a total number of subcarriers of the carrier, and the sequence is repeatedly mapped on each of the predetermined number of consecutive symbols from the lowest subcarrier to the highest subcarrier of the carrier. That is, the same sequence is mapped on each symbol. For example, assuming there are a total of N subcarriers on the carrier, then the sequence length is equal to N. The sequence may be denoted as {a0, a1, a2, a3, a4, a5, a6, a7, a8, . . . , $a_{N-1}$}. The sequence is repeatedly mapped on each of the predetermined number of consecutive symbols, which means mapping a0 on subcarrier 0 of the first symbol, a1 on subcarrier 1 of the first symbol, a2 on subcarrier 2 of the first symbol, a3 on subcarrier 3 of the first symbol, a4 on subcarrier 4 of the first symbol, and so on, till all the subcarriers of the first symbol have been mapped on, and then starting to map a0 on subcarrier 0 of the second symbol, a1 on subcarrier 1 of the second symbol, a2 on subcarrier 2 of the second symbol, and so on, till all the subcarriers of the second symbol have been mapped on, and then repeating such mapping on the remaining symbol(s), till all the subcarriers of all the predetermined number of symbols have been mapped on. It should be understood that the length of the sequence in this example is only for illustrative purpose, and should not be construed as limits to the embodiments of the present disclosure.

The sequence may be generated in different manners for different applications.

According to some embodiments of the present disclosure, the sequence may be predefined in standards as a common sequence for a radio access technology. For example, the sequence can be used to indicate whether the transmission uses 3GPP wireless technologies or WiFi. In an embodiment, an all "1" sequence may be generated for an NR sidelink transmission. It should be understood that other predefined sequences also can be used.

According to some embodiments of the present disclosure, the sequence may be predefined in standards as a common sequence for sidelink transmissions among multiple cells. So a UE can detect the sequence in transmissions from other UEs in neighboring cells. For example, the sequence can be generated according to the following equation and initialized by $c_{init}$=1010. Other values not smaller than 1008 can also be used for initialization.

$$r(m) = \frac{1}{\sqrt{2}}(1 - 2c(2m)) + j\frac{1}{\sqrt{2}}(1 - 2c(2m+1))$$

where the sequence r(m) has a length of M, m=0, 1, . . . , M−1, and the pseudo-random sequence c(m) is defined by a length-31 Gold sequence as below.

The output sequence c(n) has a length of $M_{PN}$, where n=0,1, . . . , $M_{PN}$−1, and is defined by $c(n)=(x_1(n+N_c)+x_2(n+N_c))\mathrm{mod}2$ $x_1(n+31)=(x_1(n+3)+x_1(n))\mathrm{mod}2$ $x_2(n+31)=(x_2(n+3)+x_2(n+2)+x_2(n+1)+x_2(n))\mathrm{mod}2$ where $N_c$=1600 and the first m-sequence $x_1(n)$ shall be initialized with $x_1(0)$=1,$x_1(n)$=0,n=1,2, . . . , 30. The initialization of the second m-sequence, $x_2(n)$, is denoted by $c_{init}=\Sigma_{i=0}^{30} x_2(i) \cdot 2^i$. It should be understood that the sequence can be generated using other methods as long as it is common for sidelink transmissions among multiple cells.

According to some embodiments of the present disclosure, the sequence may be predefined in standards as a sidelink cell-specific sequence. So a UE can detect the sequence in transmissions from other UEs in the same cell and cannot identify the sequence in transmissions from other UEs in neighboring cells. For example, the sequence can be generated according to the above equations and initialized by $c_{init}$=cell identity (ID). For further inter-cell interference randomization, the sequence can be initialized by a higher layer configured ID, e.g., $N_{ID} \in \{0,1, . . . , 65535\}$.

According to some embodiments of the present disclosure, the sequence may be predefined in standards as a sidelink Tx UE-specific sequence. So a UE not interested in the ongoing unicast from the Tx UE cannot identify the sequence in transmissions from the Tx UE so that the UE can skip decoding SCI or PSCCH in such transmissions. For example, the sequence can be generated according to the above equations and initialized by $c_{init}$=ID of the Tx UE. The ID can be the source ID of the Tx UE.

According to some embodiments of the present disclosure, the sequence is predefined in standard as a sidelink group-specific sequence. So a UE not interested in the ongoing groupcast communication cannot identify the sequence in transmissions from any Tx UE in the group so that the UE can skip decoding SCI or PSCCH in such transmissions. For example, the sequence can be generated according to the above equations and initialized by $c_{init}$=Group ID. This group ID is indicated or configured during the establishment of the groupcast among the UEs in the same group.

According to some embodiments of the present disclosure, the sequence is predefined in standard as a sidelink interlace-specific sequence. Since SCI from a Tx UE is transmitted only in one interlace due to much room of one interlace, an interlace-specific sequence may be designed for associated SCI transmissions. The sequence may be generated based on an index of the interlace where the SCI is transmitted. So a UE not interested in the ongoing transmission on the interlace cannot identify the sequence in transmissions from any Tx UE in the interlace so that the UE can skip monitoring the sequence on uninterested interlaces and decoding SCI or PSCCH in such transmissions. For example, the sequence can be generated according to the above equations and initialized by $c_{init}$=Interlace index.

According to some embodiments of the present disclosure, the sequence is predefined in standards and generated based on the slot and/or symbol where the sequence is transmitted. For example, the sequence can be generated according to the above equations and initialized by $$C_{init}=(2^{17}(N_{symb}^{slot}n_{s,f}^{\mu}+l+1)(2N_{ID}+1)+2N_{ID}) \bmod 2^{31}$$

where $N_{symb}^{slot}$ is the number of symbols in a slot, l is the symbol number (also, symbol index) within the slot, $n_{s,f}^{\mu}$ is the slot number (also, slot index) within a frame, and $N_{ID}$ is given based on one or more of: a cell ID, a higher layer configured ID, an ID of the Tx UE, a group ID for groupcast communication, or an interlace index assigned for transmitting the sequence.

It should be understood that the above equations used to generate the sequence are provided only for illustrative purposes. Persons skilled in the art may design different equations or approaches to generate the sequence based on one or more of: a cell ID, a higher layer configured ID, an ID of the Tx UE, a group ID for groupcast communication, or an interlace index assigned for transmitting the sequence, depending on specific applications of the sequence.

Referring again to FIG. 3, after generating the sequence, the Tx UE may transmit the sequence at a beginning of a sidelink burst on a carrier in step 304. As described above, the Tx UE needs to perform a successful LBT procedure before transmitting the sidelink burst. The sequence may be generated before performing the LBT procedure. The starting time of the sidelink burst may be unpredictable since the time when the LBT procedure succeeds is unpredictable. To resolve this issue, a set of candidate starting positions in a slot for starting the sidelink burst (i.e., for transmitting the sequence) can be configured via RRC signaling or predefined in standards. For example, the set of candidate positions may include symbol 0, symbol 3, symbol 6, and symbol 9 in the slot. It is contemplated that the set of candidate positions may include other possible symbol indices. When an LBT procedure is successful, the Tx UE may initiate a COT for transmitting the sidelink burst, which may start from a nearest candidate position of the set of candidate positions. The sidelink burst is contiguously transmitted in time domain without any gap.

Figure 4:
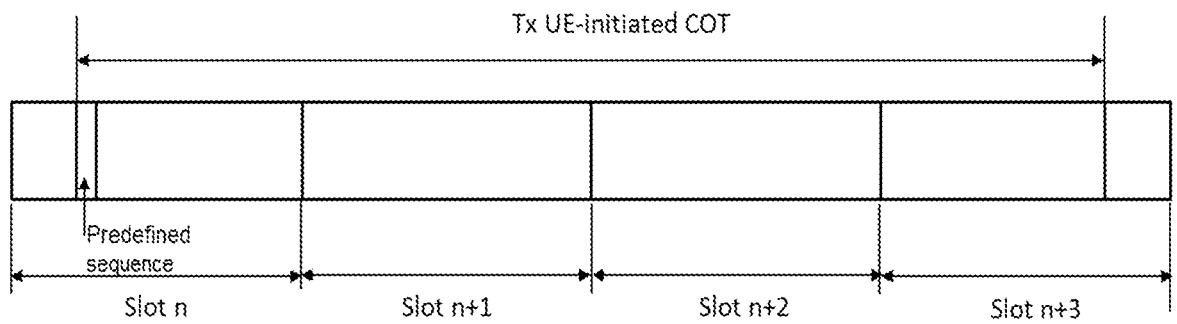
FIG. 4 illustrates an example of transmitting a predefined sequence only at a beginning of a sidelink burst according to some embodiments of the present disclosure.

In an embodiment of the present disclosure, the sequence is transmitted only at the beginning of the sidelink burst. FIG. 4 illustrates an example of transmitting the sequence only at the beginning of the sidelink burst. In this example, the Tx UE-initiated COT for the sidelink burst may spans from slot n to slot n+3, and the sequence is transmitted only at the beginning of the sidelink burst in the first slot (i.e., slot n).

Figure 5:
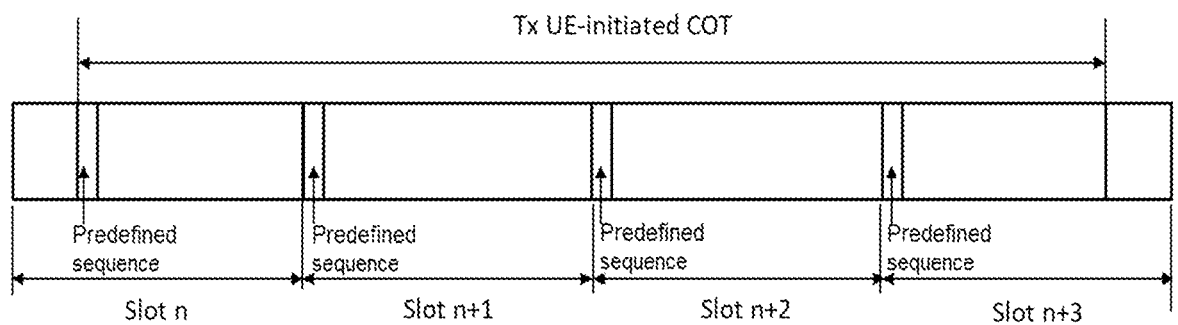
FIG. 5 illustrates an example of transmitting a predefined sequence in each slot of a sidelink burst according to some embodiments of the present disclosure.

In another embodiment of the present disclosure, in addition to transmitting the sequence at the beginning of the sidelink burst in the first slot, the Tx UE may further transmit the sequence at a beginning (i.e., symbol 0) of each of the other slots of the sidelink burst. FIG. 5 illustrates an example of transmitting the sequence in each slot of the sidelink burst. In this example, the Tx UE-initiated COT for the sidelink burst may spans from slot n to slot n+3, and the sequence is transmitted at the beginning of the sidelink burst in the first slot (i.e., slot n) and at the beginning of each subsequent slot (i.e., slot n+1, slot n+2, and slot n+3). In this way, an Rx UE may have more opportunities to detect the sequence especially when the Rx UE misses previous sequence transmission(s) due to half duplex constrains.

As described above, the sequence is generated to occupy all the subcarriers on the carrier. However, the sidelink burst is transmitted only within the bandwidth of a sidelink bandwidth part (BWP) of the carrier, and on the subcarriers (e.g., an interlace) within the sidelink BWP assigned for the sidelink burst, i.e., where the Tx UE is occupying for transmitting PSCCH and associated PSSCH. Thus, only part of the sequence is transmitted on the intersection of the assigned interlace(s) and the sidelink BWP. In another embodiment, the Tx UE may transmit the sequence on all the subcarriers within the bandwidth of the sidelink BWP. Again, only part of the sequence within the sidelink BWP, rather than an entirety of the generated sequence, is transmitted.

Figure 6:
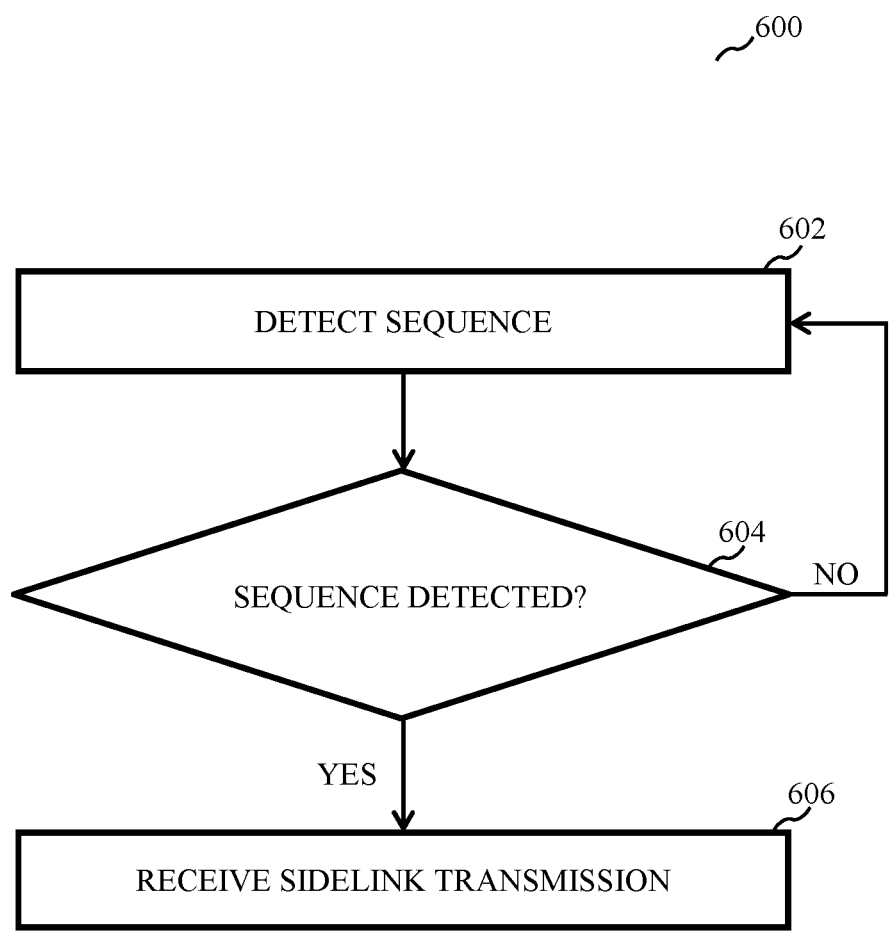
FIG. 6 illustrates an exemplary flow chart of a method for detecting a sidelink transmission burst over an unlicensed spectrum according to some embodiments of the present disclosure.

FIG. 6 illustrates an exemplary flow chart of a method 600 for detecting a sidelink transmission burst over an unlicensed spectrum according to some embodiments of the present disclosure. The method 600 may be performed by an Rx UE or other devices having similar functionality.

As shown in FIG. 6, in step 602, the Rx UE may detect, on a carrier, a sequence at a first candidate position of a set of candidate positions in a slot. The set of candidate positions may be configured via RRC signaling or predefined in standards for the Rx UE to monitor the sequence. For example, the set of candidate positions may include symbol 0, symbol 3, symbol 6, and symbol 9 in the slot. It is contemplated that the set of candidate positions may include other possible symbol indices.

The sequence may span a predetermined number of consecutive symbols in time domain. In some embodiments of the present disclosure, the predetermined number may be configured via RRC signaling or predefined in standards based on an SCS value of the carrier and an AGC retuning time.

In different applications, the sequence may represent different indications to the Rx UE. For example, the sequence may be based on one or more of: a cell ID, a higher layer configured ID, an ID of the Tx UE, a group ID for groupcast communication, or an interlace index assigned for transmitting the sequence, depending on specific applications of the sequence.

According to some embodiments of the present disclosure, the sequence may be predefined in standards as a common sequence for a radio access technology. For example, the Rx UE can determine whether an ongoing transmission uses 3GPP wireless technologies or WiFi, depending on whether the sequence is detected in the transmission.

According to some embodiments of the present disclosure, the sequence may be predefined in standards as a common sequence for sidelink transmissions among multiple cells. For example, the Rx UE can determine whether an ongoing transmission is a sidelink transmission from a Tx UE in one of the multiple cells, depending on whether the sequence is detected in the transmission.

According to some embodiments of the present disclosure, the sequence may be predefined in standards as a sidelink cell-specific sequence. For example, the Rx UE can determine whether an ongoing transmission is a sidelink transmission from a Tx UE in the same cell as the Rx UE, depending on whether the sequence is detected in the transmission.

According to some embodiments of the present disclosure, the sequence may be predefined in standards as a sidelink Tx UE-specific sequence. For example, the Rx UE can determine whether an ongoing transmission is a sidelink transmission from a Tx UE that the Rx UE is interested in, depending on whether the sequence is detected in the transmission.

According to some embodiments of the present disclosure, the sequence is predefined in standard as a sidelink group-specific sequence. For example, the Rx UE can determine whether an ongoing transmission is a sidelink groupcast communication that the Rx UE is interested in, depending on whether the sequence is detected in the transmission.

According to some embodiments of the present disclosure, the sequence is predefined in standard as a sidelink interlace-specific sequence. For example, the Rx UE can determine whether an ongoing transmission is transmitted on an interlace that the Rx UE is interested in, depending on whether the sequence is detected in the transmission.

As described above with respect to FIG. 3, the sequence may be predefined relative to subcarrier 0 of resource block 0 of the carrier and mapped on all subcarriers of the carrier in frequency domain, but only part of the predefined sequence is transmitted in the assigned sidelink BWP. Thus, the Rx UE may detect part of the predefined sequence within the sidelink BWP, rather than an entirety of the generated sequence. In some embodiments of the present disclosure, the sequence is detected only on subcarriers within the sidelink BWP assigned for the sidelink transmission. In some embodiments of the present disclosure, the sequence is detected on all subcarriers within the sidelink BWP.

Referring again to FIG. 6, when the sequence is not detected at the first candidate position (i.e., the "NO" branch of step 604), method 600 may return to step 602, and the Rx UE may detect, in the slot, the sequence at a second candidate position of the set of candidate positions. The second candidate position may be subsequent to the first candidate position in the set of candidate positions. When the sequence is still not detected at the second candidate position, the Rx UE may detect the sequence at a third candidate position in the set of candidate positions of the slot, and so on, until the sequence is detected at a candidate position of the slot. When the Rx UE fails to detect the sequence at any candidate position of the slot, the Rx UE may skip detection of SCI or PSCCH in the slot, and detect the sequence at each candidate position of the next slot in the same manner.

When the sequence is detected at a candidate position of the slot (i.e., the "YES" branch of step 604), the method 600 may proceed to step 606, and the Rx UE may receive the sidelink transmission from the candidate position. For example, when the sequence is detected at the first candidate position, the Rx UE may receive the sidelink transmission on the carrier from the first candidate position; when the sequence is detected at the second candidate position, the Rx UE may receive the sidelink transmission on the carrier from the second candidate position. Then the Rx UE may detect PSCCH and associated PSSCH in the sidelink transmission. According to some embodiments of the present disclosure, when the sequence is detected by the Rx UE in one slot, the Rx UE may skip detection of other candidate positions in the same slot. According to some embodiments of the present disclosure, when the sequence is detected by the Rx UE in one slot of the sidelink burst and the Rx UE is aware of the duration of the sidelink burst or the ending position of the sidelink burst, the Rx UE may skip detection of other candidate positions in the same sidelink burst.

Figure 7:
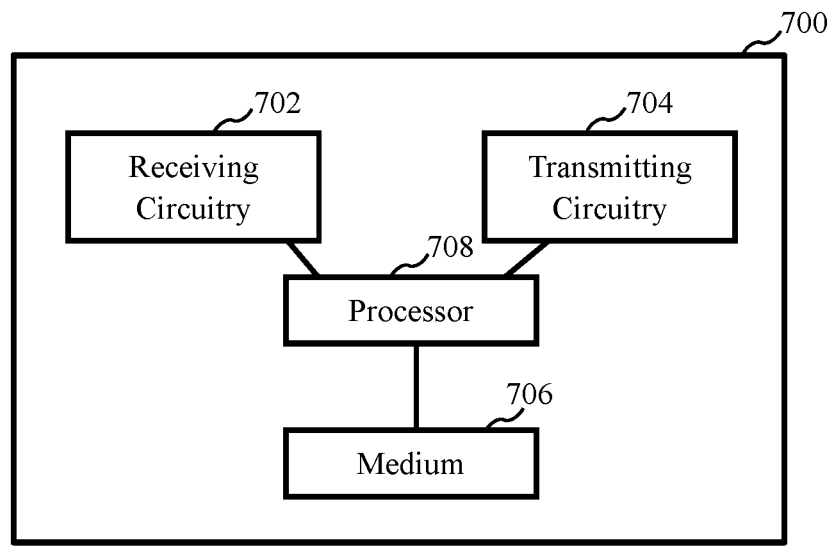
FIG. 7 illustrates an exemplary block diagram of an apparatus according to some embodiments of the present disclosure.

FIG. 7 illustrates an exemplary block diagram of an apparatus 700 according to some embodiments of the present disclosure. In some embodiments of the present disclosure, the apparatus 700 may be a Tx UE or other devices having similar functionality, which can at least perform the method illustrated in FIG. 3.

As shown in FIG. 7, the apparatus 700 may include at least one receiving circuitry 702, at least one transmitting circuitry 704, at least one non-transitory computer-readable medium 706, and at least one processor 708 coupled to the at least one receiving circuitry 702, the at least one transmitting circuitry 704, the at least one non-transitory computer-readable medium 706. While shown to be coupled to each other via the at least one processor 708 in the example of FIG. 7, the at least one receiving circuitry 702, the at least one transmitting circuitry 704, the at least one non-transitory computer-readable medium 706, and the at least one processor 708 may be coupled to one another in various arrangements. For example, the at least one receiving circuitry 702, the at least one transmitting circuitry 704, the at least one non-transitory computer-readable medium 706, and the at least one processor 708 may be coupled to each other via one or more local buses (not shown for simplicity).

Although in FIG. 7, elements such as receiving circuitry 702, transmitting circuitry 704, non-transitory computer-readable medium 706, and processor 708 are described in the singular, the plural is contemplated unless limitation to the singular is explicitly stated. In some embodiments of the present disclosure, the at least one receiving circuitry 702 and the at least one transmitting circuitry 704 are combined into a single device, such as a transceiver. In certain embodiments of the present disclosure, the apparatus 700 may further include an input device, a memory, and/or other components.

In some embodiments of the present disclosure, the at least one non-transitory computer-readable medium 706 may have stored thereon computer-executable instructions which are programmed to cause the at least one processor 708 to implement the steps of the methods, for example as described in view of FIG. 3, with the at least one receiving circuitry 702 and the at least one transmitting circuitry 704. For example, when executed, the instructions may cause the at least one processor 708 to generate a sequence spanning a predetermined number of consecutive symbols in time domain. The instructions may further cause the at least one processor 708 to transmit, with the at least one transmitting circuitry 704, the sequence at a beginning of a sidelink burst on a carrier, starting from a first candidate position of a set of candidate positions in a first slot, wherein the sidelink burst is contiguously transmitted in time domain without any gap.

Figure 8:
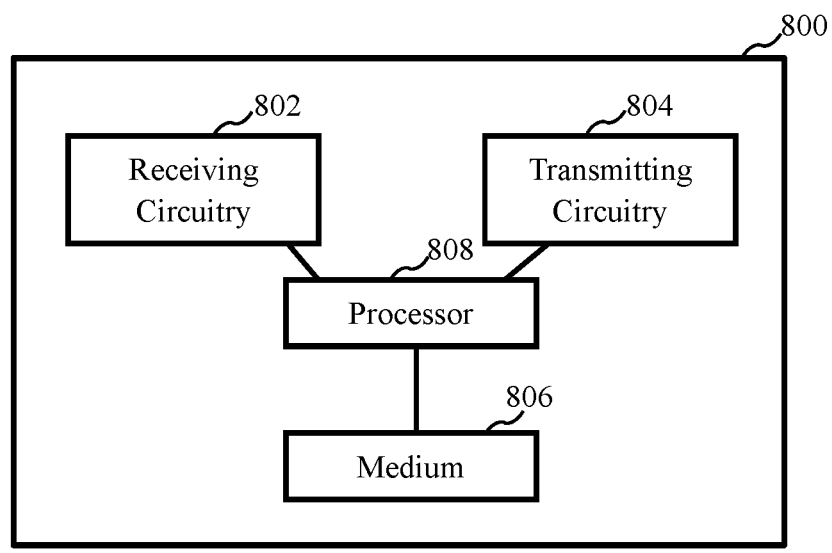
FIG. 8 illustrates an exemplary block diagram of another apparatus according to some embodiments of the present disclosure.

FIG. 8 illustrates an exemplary block diagram of an apparatus 800 according to some embodiments of the present disclosure. In some embodiments of the present disclosure, the apparatus 800 may be an Rx UE or other devices having similar functionality, which can at least perform the method illustrated in FIG. 6.

As shown in FIG. 8, the apparatus 800 may include at least one receiving circuitry 802, at least one transmitting circuitry 804, at least one non-transitory computer-readable medium 806, and at least one processor 808 coupled to the at least one receiving circuitry 802, the at least one transmitting circuitry 804, the at least one non-transitory computer-readable medium 806. While shown to be coupled to each other via the at least one processor 808 in the example of FIG. 8, the at least one receiving circuitry 802, the at least one transmitting circuitry 804, the at least one non-transitory computer-readable medium 806, and the at least one processor 808 may be coupled to one another in various arrangements. For example, the at least one receiving circuitry 802, the at least one transmitting circuitry 804, the at least one non-transitory computer-readable medium 806, and the at least one processor 808 may be coupled to each other via one or more local buses (not shown for simplicity).

Although in FIG. 8, elements such as receiving circuitry 802, transmitting circuitry 804, non-transitory computer-readable medium 806, and processor 808 are described in the singular, the plural is contemplated unless limitation to the singular is explicitly stated. In some embodiments of the present disclosure, the at least one receiving circuitry 802 and the at least one transmitting circuitry 804 are combined into a single device, such as a transceiver. In certain embodiments of the present disclosure, the apparatus 800 may further include a memory and/or other components.

In some embodiments of the present disclosure, the at least one non-transitory computer-readable medium 806 may have stored thereon computer-executable instructions which are programmed to cause the at least one processor 808 to implement the steps of the methods described herein with the at least one receiving circuitry 802 and the at least one transmitting circuitry 804. For example, when executed, the instructions may cause the at least one processor 808 to detect, on a carrier, a sequence at a first candidate position of a set of candidate positions in a slot, wherein the sequence spans a predetermined number of consecutive symbols in time domain. The instructions may further cause the at least one processor 808 to receive, with the at least one receiving circuitry 802, a sidelink transmission from the first candidate position in the slot in response to the sequence being detected at the first candidate position.

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration (VLSI) circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, or program code. The storage devices may be tangible, non-transitory, or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Furthermore, the described features, structures, or characteristics of the embodiments may be combined in any suitable manner. While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including".

What is claimed is:

1. A method performed by a user equipment (UE) for wireless communication, comprising:

generating a sequence; and transmitting the sequence at a beginning of a sidelink burst on a carrier, starting from a first candidate position of a set of candidate positions in a first slot, wherein the sequence spans a predetermined number of consecutive symbols in time domain and the sidelink burst is contiguously transmitted in time domain without any gap, and wherein a length of the sequence is equal to a total number of subcarriers of the carrier multiplied by the predetermined number, and the sequence is cyclically mapped on each of the predetermined number of consecutive symbols in a frequency-first manner or repeatedly mapped on each of the predetermined number of consecutive symbols.

2. The method of claim 1, wherein the sequence is predefined relative to subcarrier 0 of resource block 0 of the carrier and mapped on all subcarriers of the carrier in frequency domain.

3. The method of claim 1, wherein the sidelink burst is transmitted in a sidelink bandwidth part (BWP) of the carrier.

4. A user equipment (UE), comprising:
at least one memory; and
at least one processor coupled with the at least one memory and configured to cause the UE to:
generate a sequence; and
transmit the sequence at a beginning of a sidelink burst on a carrier, starting from a first candidate position of a set of candidate positions in a first slot, wherein the sequence spans a predetermined number of consecutive symbols in time domain and the sidelink burst is contiguously transmitted in time domain without any gap, and wherein a length of the sequence is equal to a total number of subcarriers of the carrier multiplied by the predetermined number, and the sequence is cyclically mapped on each of the predetermined number of consecutive symbols in a frequency-first manner or repeatedly mapped on each of the predetermined number of consecutive symbols.

5. A user equipment (UE), comprising:
at least one memory; and
at least one processor coupled with the at least one memory and configured to cause the UE to:
detect, on a carrier, a sequence at a first candidate position of a set of candidate positions in a slot, wherein the sequence spans a predetermined number of consecutive symbols in time domain; and
receive a sidelink transmission from the first candidate position in the slot in response to the sequence being detected at the first candidate position, wherein the sequence spans a predetermined number of consecutive symbols in time domain, and wherein a length of the sequence is equal to a total number of subcarriers of the carrier multiplied by the predetermined number, and the sequence is cyclically mapped on each of the predetermined number of consecutive symbols in a frequency-first manner or repeatedly mapped on each of the predetermined number of consecutive symbols.

6. The UE of claim 5, wherein the at least one processor is further configured to cause the UE to:
detect, in the slot, the sequence at a second candidate position of the set of candidate positions in response to the sequence not being detected at the first candidate position, wherein the second candidate position is subsequent to the first candidate position in the set of candidate positions.

7. The UE of claim 5, wherein the at least one processor is further configured to cause the UE to:
skip detection of a physical sidelink control channel in the slot in response to the sequence not being detected at any candidate position of the set of candidate positions in the slot.

8. The UE of claim 5, wherein the sequence is predefined relative to subcarrier 0 of resource block 0 of the carrier and mapped on all subcarriers of the carrier in frequency domain.

9. The UE of claim 5, wherein the set of candidate positions is configured via radio resource control (RRC) signaling or predefined in standards.

10. The UE of claim 5, wherein the predetermined number is configured via radio resource control (RRC) signaling or predefined in standards.

11. The UE of claim 4, wherein the sequence is predefined relative to subcarrier 0 of resource block 0 of the carrier and mapped on all subcarriers of the carrier in frequency domain.

12. The UE of claim 4, wherein the sidelink burst is transmitted in a sidelink bandwidth part (BWP) of the carrier.

13. The UE of claim 4, wherein the set of candidate positions is configured via radio resource control (RRC) signaling or predefined in standards.

14. The UE of claim 4, wherein the predetermined number is configured via radio resource control (RRC) signaling or predefined in standards or determined based on a subcarrier spacing value and an automatic gain control retuning time.

15. The UE of claim 4, wherein the sequence is transmitted only at the beginning of the sidelink burst.

16. The UE of claim 4, wherein the at least one processor is configured to cause the UE to:
transmit the sequence at a beginning of each slot of the sidelink burst except the first slot.

17. The UE of claim 4, wherein the sequence indicates that a radio access technology is used.

18. The UE of claim 4, wherein the sequence is a common sequence for sidelink transmissions among multiple cells.

19. The UE of claim 4, wherein the sequence is generated based on one or more of a cell identity (ID), a higher layer configured ID, an ID of the UE, a group ID for groupcast communication, or an interlace index assigned for transmitting the sequence.

20. A method performed by a user equipment (UE) for wireless communication, comprising:
detecting, on a carrier, a sequence at a first candidate position of a set of candidate positions in a slot, wherein the sequence spans a predetermined number of consecutive symbols in time domain; and
receiving a sidelink transmission from the first candidate position in the slot in response to the sequence being detected at the first candidate position, wherein the sequence spans a predetermined number of consecutive symbols in time domain, and wherein a length of the sequence is equal to a total number of subcarriers of the carrier multiplied by the predetermined number, and the sequence is cyclically mapped on each of the predetermined number of consecutive symbols in a frequency-first manner or repeatedly mapped on each of the predetermined number of consecutive symbols.

* * * * *